United States Patent
Acharya et al.

(10) Patent No.: US 6,654,501 B1
(45) Date of Patent: Nov. 25, 2003

(54) METHOD OF INTEGRATING A WATERMARK INTO AN IMAGE

(75) Inventors: Tinku Acharya, Tempe, AZ (US); Kannan Raj, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/519,874

(22) Filed: Mar. 6, 2000

(51) Int. Cl.⁷ .................................................. G06K 9/46
(52) U.S. Cl. ......................................... 382/235; 380/269
(58) Field of Search ................................. 382/100, 235, 382/296, 239; 380/205, 206, 239, 201, 213, 229, 272, 269; 356/71

(56) References Cited

U.S. PATENT DOCUMENTS

| | | | | |
|---|---|---|---|---|
| 5,598,526 A | * | 1/1997 | Daniel et al. | 345/540 |
| 5,689,626 A | * | 11/1997 | Conley | 358/1.18 |
| 5,809,160 A | * | 9/1998 | Powell et al. | 382/100 |
| 6,208,735 B1 | * | 3/2001 | Cox et al. | 380/54 |
| 6,247,084 B1 | * | 6/2001 | Apostol et al. | 710/108 |
| 6,252,675 B1 | * | 6/2001 | Jacobs | 358/1.9 |
| 6,252,971 B1 | * | 6/2001 | Wang | 382/100 |
| 6,345,104 B1 | * | 2/2002 | Rhoads | 381/100 |
| 6,449,380 B1 | * | 9/2002 | Acharya et al. | 382/100 |

* cited by examiner

*Primary Examiner*—Jayanti K. Patel
*Assistant Examiner*—Seyed Azarian
(74) *Attorney, Agent, or Firm*—Blakely, Sokoloff, Taylor & Zafman LLP

(57) ABSTRACT

In accordance with one embodiment of the invention, a method of integrating a watermark, or portion thereof, into an image, or portion thereof, includes the following. The watermark, or portion thereof, is blended into the image, or portion thereof, so as to appear as noise.

6 Claims, 3 Drawing Sheets

METHOD OF INTEGRATING A WATERMARK INTO AN IMAGE

RELATED APPLICATION

This patent application is related to concurrently filed U.S. patent application Ser. No. 09/519,135, titled "Method of Integrating a Watermark into a Compressed Image," by Acharya et al., assigned to the assignee of the current invention and herein incorporated by reference.

BACKGROUND

This disclosure is related to watermarking and, more particularly, to integrating or embedding a watermark into an image, such as a digital image.

The management of information securely is becoming a more challenging problem with the progress of information technology, especially in the area of digital imaging. Identification of ownership and/or other rights with respect to an image when transmitted through a network, such as a public network, is receiving a great deal of attention. Information management and the secure movement of image data are becoming complex tasks, particularly in light of the rapid evolution of a variety of technologies. "Digital Watermarking" may provide a potential solution to this problem.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
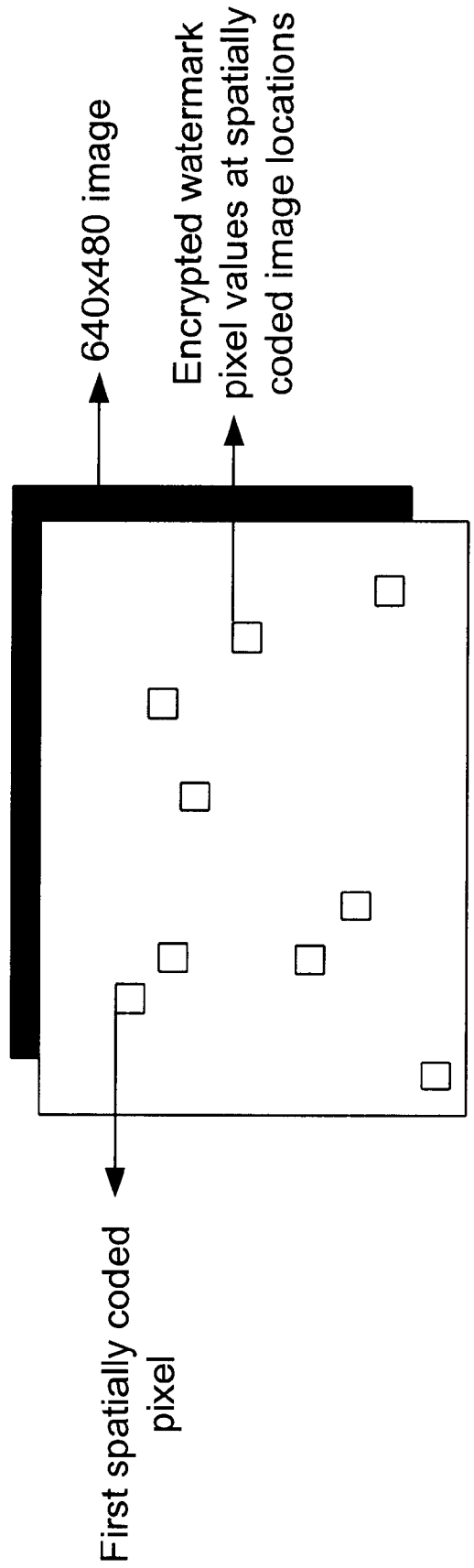
FIG. 1 is a schematic diagram illustrating one example of application of an embodiment of a method of integrating a watermark into an image in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the techniques used by those skilled in the data processing arts to convey the substance of their work to others skilled in the art. An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification discussions utilizing terms such as "processing" or "computing" or "calculating" or "determining" or the like refer to the action and processes of a computer or a computing system, or a similar electronic computing device that manipulate and transform data represented as physical, such as electronic, quantities within the computing system's registers and/or memories into other data similarly represented as physical quantities within the computing system's memories, registers or other such information storage, transmission, retrieval, or display devices.

Operations, such as image acquisition, encoding, manipulation, transmission, retrieval, or storage typically involve careful handling of noise that may be present in one or more images and which may appear as perceptually disturbing artifacts when the image or images are displayed or rendered. The impact of this may be reduced by reducing the presence of noise at the source. However, this may not always be possible, and images that are digitally captured may at times be left with remanents of noise, even after the application of noise reduction techniques. Techniques and processes are available to reduce the impact of spatial noise on still images and digital cameras and to reduce both spatial and high frequency noise in video image capture systems. However, another field of image representation is referred to as "Digital Watermarking" in which specific signal information is typically encoded as "noise." A Digital Watermark may be a specially encoded symbol or signature placed in the image for the purpose of image authentication or verification or simply for encoding secret information in one or more images.

It would be desirable to have a process or technique for encoding a digital watermark so that it is unaffected, or at least substantially unaffected, by such noise reduction techniques. One embodiment of a method of integrating a watermark into an image in accordance with the present invention provides that capability.

Digital Watermarks, such as logos or signatures, may be embedded in images by treating the watermark signal information as perceptually insignificant noise and introducing it into the image. As one example, although the invention is not limited in scope in this respect, the watermark itself may be, for example, a 32×32 image block of a logo or signature that may be encrypted or, alternatively, employed in the form provided. This watermark signal information may be blended into the entire image, or a subportion thereof. Likewise, a portion or subportion of the watermark, whether or not encoded or encrypted, may be blended in the image, or a portion thereof. In this context, the term "blend", "blended" or "blending" refers to a process where signal samples from different or multiple sources, such as from an image and from a watermark, are combined, typically so that, when the image is viewed, a human observer would have difficulty distinguishing the combined pixels from the uncombined pixels. Of course, there are a variety of ways in which this combining may be implemented and the invention is not limited in scope to any particular technique.

Typically, after an image is captured by an image capture device, such as an imager, for example, it undergoes image processing, such as described above, to reduce noise after the image has been captured. When the Digital Watermark in the form of pseudo-noise is encoded in the image, such noise reduction techniques may corrupt the encoded watermark signal information and, hence, the watermark may not be recoverable for identification and/or authentication.

In one embodiment of a method of integrating a watermark into an image in accordance with the present invention, encoded watermark signal information is integrated into an image by blending the encoded data of the watermark with the data of the image, or a selected portion thereof. The watermark signal information may be decoded prior to compression of the images and the encrypted version of the watermark signal may be integrated into the compressed data of the original image with some relevant information in the header, such as described, for example, in the aforementioned concurrently filed patent application, although the invention is not limited in scope in this respect. During the decompression, the encrypted watermark information may first be extracted from the compressed bit stream and decoded, again, as described in the aforementioned patent application, although the invention is not limited in scope in this respect. After decompression of the original image, the decoded watermark signal information may be blended with the decompressed image in a perceptually lossless manner, for example, using the embodiment in accordance with the present invention described hereinafter.

Encryption of watermark signal information may be done by encoding the information in the spatial domain or the frequency domain. Image or spatial domain encoding may involve random bits for scrambling and unscambling with a "key" similar to what has been applied in 128-bit encryption for Internet applications, for example. See, for example, "A method for obtaining digital signatures and public key cryptosystem," ACM Commun. 1978, Vol. 21, pp120–126; "Evaluation of selective encryption techniques for secure transmission of MPEG-compressed bit-streams," Alattar et al., Proc. ISCAS, pp 340–343. vol. 14, 1999; or "Combining data compression and encryption," C. Finnila, IEEE WESCON/94, pp 404–409, although these articles are, of course, provided merely as examples. Alternately, frequency domain encoding may be done any one of a number of ways, such as with Fourier transform encoding, wavelet transform encoding, Walsh-Hadamard transform encoding, etc. It will, of course, be appreciated by one of ordinary skill in the art that these are just examples of image domain encoding and frequency transform domain encoding, and the invention is not limited in scope to any particular approach. Any one of a number of currently known or to later be developed approaches may be employed.

As previously indicated, Digital Watermarking provides a potential solution to the problem of image authentication or verification or simply for encoding secret information in one or more images. However, as previously indicated, a number of techniques for Digital Watermarking are available. If one such technique represents the Digital Watermark as noise, that may prove advantageous for a variety of reasons. However, if such an approach were employed, it would be desirable if the technique could also prevent noise reduction processing from removing or at least substantially affecting the "noise" associated with the Digital Watermark. Likewise, it would be desirable if the noise representing the Digital Watermark were imperceptible enough to not substantially affect the quality of the image. An embodiment of a method of integrating a watermark into an image in accordance with the present invention provides at least some of these capabilities.

In the previously cited concurrently filed patent application, the encoded watermark was integrated with a compressed image. However, in an embodiment in accordance with the present invention, the encoded watermark may be blended with the image prior to compression. It is desirable, however, to ensure that the introduced watermark pixel signal values blend into the digital image without introducing significant degradation in the quality of the image, such as by avoiding or reducing the appearance of a large blemish, for example. The principle of embedding the watermarking information is accomplished, in this particular embodiment, based on the selection of "smooth" regions, referred to in this context as non-texture regions, as described in more detail below. Therefore, in this embodiment, the smooth or non-texture regions will continue to be smooth after such image processing, and, therefore, remain substantially unaffected.

FIG. 1 illustrates spatially coded scattering of a 32×32 encrypted watermark in a digital image. It will, of course, be appreciated that the invention is not limited in scope to employing an encrypted watermark or to a particular size or shaped watermark. In this particular embodiment, to do the spatial coding, the following information is employed:

(1) The encoded or encrypted, here 32×32, watermark signal information, or a portion thereof;

(2) the first pixel location of the encrypted or encoded watermark in the digital image;

(3) a pseudo-random number generator that points to the subsequent watermark pixel locations in a digital image; and (4) the scanning pattern used, such as left to right or top to bottom in a rastor scan or serpentine manner, for example.

Once the first pixel location is known, an encrypted watermark pixel signal value, in this particular embodiment, is made to blend with the image pixel signal at that pixel location so as to appear as noise to an ordinary observer of the image. In this particular embodiment, the next pixel location is generated from a known random number seed. Thus, a random number generator produces a random number (in this context the term "random" is employed to mean "pseudo-random") which points to the next pixel location from the existing one, where the next watermark pixel signal value is to be blended. Thus, in this particular embodiment, by knowing the starting pixel location and the random number seed, as well as a particular random number generator or technique employed, one may recover the locations of the spatially coded watermark signal values. This is illustrated in FIG. 1, for example, for this embodiment.

Having positioned the watermark signal values in the digital image, it is desirable to have the encrypted watermark signal values blended with the digital image so as to appear as noise to an ordinary observer of the overall image. For example, if one were to encode a 32×32 encrypted Digital Watermark in a 640×480 digital image, this would result in approximately one watermark pixel signal value for every 300 pixel signal values in the digital image. It will, of course, be appreciated that these dimensions are provided merely as examples, and the invention is not limited in scope in this respect. For higher resolution images, this ratio will be even larger, reducing the impact of embedding "noise" in the image.

In this particular embodiment, the process of embedding or integrating the encrypted Digital Watermark signal values in the digital image in the form of noise may be accomplished by blending encrypted Digital Watermark signal values with the signal values of the digital image. For example, for pixel locations in the image in which some pixels are dark, it may better perceptually for the encoded data to be closer to dark pixels to make the "noise" less perceptible, although, this is just an example. In this particular embodiment, assume that a 32×32 Digital Watermark block is encrypted. C(B) represents the bit stream of the encoded block B. In this particular embodiment, C(B) is divided into a number groupings of bits, such as, for example, four bit "nibbles," which represent the watermark encoded signal values. For example, $$C(B)=N_0N_1N_2N_3 \ldots N_m \qquad [1]$$

where each $N_i$ represents a nibble in C(B), the binary digital signal or bit representation of the encoded signal values. Of course, the invention is not limited in scope to the manner in which C(B) is divided; for example, in an alternative embodiment, C(B) may be divided into bytes, or any sized grouping of bits.

Figure 2:
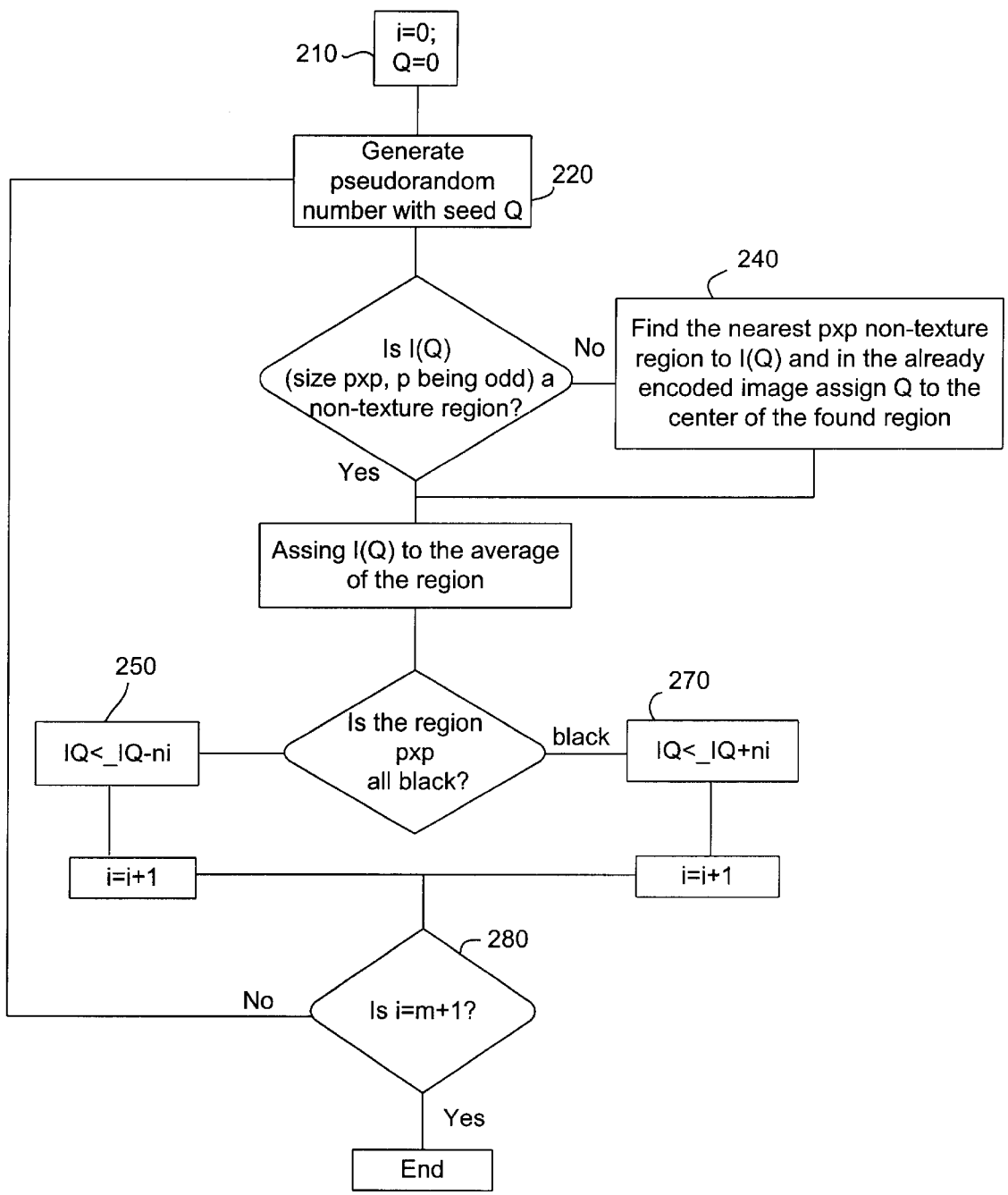
FIG. 2 is a flowchart illustrating one embodiment of a method of integrating a watermark into an image in accordance with the present invention.

Although the invention is not limited in scope in this respect, in this particular embodiment, the following technical process may be employed to blend encrypted watermark signal values into the pixel signal values of the digital image. This is also illustrated by the flowchart in FIG. 2. First, at block 210, let Q=0. In this particular embodiment, Q is the seed for the random number or pseudo-random number generator. Therefore, at block 220, use the random number generator with Q to produce or generate a new random number, that is assigned to Q in place of the previous number; in this instance, in place of 0. A pixel P(m,n) may be mapped into I(P) where P=m*c+n, c is the number of pixels in each row, r is the number of rows, m goes from 0 to r−1 by 1, and n goes from 0 to c−1 by 1. By this technique, Q may be mapped to a pixel location $I_Q$, although, of course, any one of a number of other techniques for making an assignment between numbers and pixel locations may be employed. If the pixel location, that is $I_Q$, is in a texture region, in this embodiment a 3×3 "texture" region, then that pixel location is not employed. By texture region, we mean a region with at least one pixel value is abruptly different compared to its surroundings. There are a variety of techniques, of course, that may be used to measure this. For example, for each pixel location in the specific region, the average of the values of the surrounding, contiguous pixel locations may be calculated, and if the magnitude of the pixel signal value in that pixel location is different from this average by more than 20 or 25%, for example, and if this pixel location is in the region, then the region may be considered to be a texture region. Of course, this is just one example of a technique that may be employed, and any one of a number of other techniques may be employed and provide acceptable performance. Furthermore, although in this particular embodiment, the size of the region is 3×3, the invention is not limited in scope in this respect. Therefore, a region of any shape and size may be employed, although the particular embodiment in FIG. 2 illustrates regions that are square and have dimensions that are an odd number. However, if the pixel location resulting from applying the pseudo-random number process places the pixel location in a texture region, then the nearest 3×3 nontexture region to this pixel location is sought, as illustrated by block 240. In this context, a nontexture region is simply a region that does not meet the criteria of a texture region; however, the criteria for a texture region is such that a nontexture region is "smooth" or has relatively slowly varying values with small differences between neighboring pixels. Once a nontexture region is located, Q is assigned the value that is the pixel location at the center of that region.

It is noted that in this particular embodiment, black is designated by all 0s and nearly black means small pixel values, such as, for example, less than 32, where, for this particular embodiment, the signal values may vary from 0 to 255. Of course, the invention is not limited in scope to either this definition of nearly black or to this specific range of signal values. However, a range from 0 to 255 is employed typically where each pixel signal value is eight bits. In this particular embodiment, once the nontexture region is located, the process for this particular embodiment depends at least in part on whether the region is black or nearly black. If the region is black or nearly black, that is, the average of the neighboring pixels contiguous with $I_Q$ is less than 32 in this particular embodiment, then the pixel signal value for the location $I_Q$, where Q is the location of the center of the nontexture region, is assigned a value that is the average of the neighboring pixels contiguous with that pixel location, plus the value of the nibble, $N_i$. Otherwise, if the region is not black or nearly black, then for the pixel location, $I_Q$, that pixel location is assigned the signal value that is the average of the neighboring, contiguous pixels, minus the signal value of the nibble, $N_i$. This is illustrated by blocks 250 and 270. As further illustrated in FIG. 2 with block 280, if the end of C(B) has not been reached, then the process continues to determine the next pixel location.

In this particular embodiment, the encoded pixel signal values will appear to an ordinary observer as high frequency noise because the encoded values are scattered throughout the image. However, the previously described embodiment will enable meaningful representation or the watermark, which may then be extracted by applying an inverse process in order to evaluate the authenticity of the image and use it for further transmission to other recipients, for example. An aspect of this particular embodiment, although the invention is not limited in scope in this respect, is the secure transfer of information. For example, for this embodiment, if both the sender and the receiver are familiar with the approach employed to integrate the watermark into the image, then someone else intercepting the image will generally be unable to extract or recover the watermark, and, therefore, will not be able to access the information being transmitted in this fashion. Likewise, it may be possible for the receiver to tell if image has been intercepted and whether some tampering has occurred.

Figure 3:
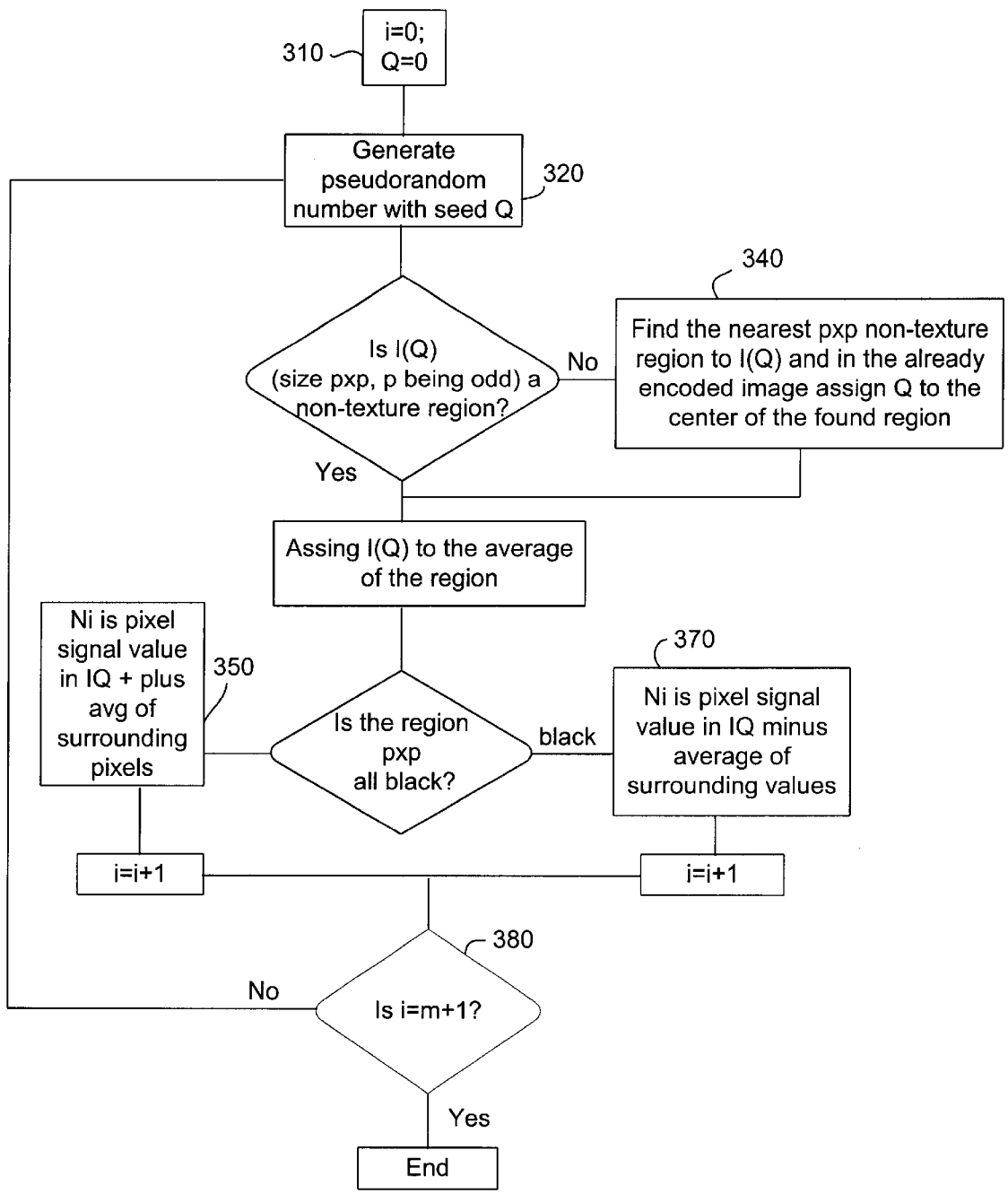
FIG. 3 is a flowchart illustrating one embodiment of a method of recovering the integrated watermark from an image in accordance with the present invention, specifically for the embodiment illustrated in FIG. 2.

FIG. 3 is a flowchart illustrating an embodiment in accordance with the present invention for recovering an integrated watermark from an image. Although the invention is not limited in scope to this particular embodiment, it is desirable, for a particular embodiment of a method of integrating a watermark into an image, that a corresponding embodiment for recovering the integrated watermark be employed. For example, the same random number generator must be employed. As FIG. 3 illustrates, the process for extracting or recovering the watermark is quite similar to the process for integrating the watermark, at least for these embodiments. One difference, of course, is that in blocks 350 and 370, which correspond to blocks 250 and 270 in FIG. 2, the average of the neighboring pixels is removed to recover $N_i$.

This particular embodiment provides a number of advantages. This approach provides a technique for representing watermarks in an image in a perceptually lossless manner, i.e. a human observer would have difficulty distinguishing the image with the integrated watermark from the original one. Likewise, the watermark is encoded as noise artifacts, which may at times be advantageous for security reasons, as previously explained. The encoding process for this embodiment is employed to account for zero clipping or saturation clipping, as previously described with respect to dark or black pixels, for example. Furthermore, the watermark is spatially coded in unique pixel locations using a starting value and a random number generator. Therefore, in this embodiment, a double level of encryption may be employed, first, with regard to encrypting watermark signal values, and second, with regard to the location of the signal values in the digital image. A third level security feature relates to the choice of the manner of scanning from one pixel location to another, such as from top to bottom, left to right, etc. Likewise, for this particular embodiment of a process, it is not computationally complex, and, therefore, relatively easy, to apply inverse transforms or processing to extract the watermark and verify authenticity. Likewise, it is relatively easy to strip the watermark data prior to compression/decompression for image transmission/recovery, etc.

It will, of course, be understood that, although a particular embodiment has just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, may result in a method of upscaling a color image in accordance with the invention, such as, for example, the embodiment previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of integrating an encrypted watermark, or portion thereof, into an image, or portion thereof, comprising:

blending the encrypted watermark, or portion thereof, into the image, or portion thereof, so as to appear as noise, wherein blending the encrypted watermark into the image comprises dividing the encrypted watermark into 4 bit nibbles and combining the nibbles with image pixel signal values distributed over the image.

2. The method of claim 1, wherein combining the nibbles with image pixel signal values comprises combining a particular nibble in a selected pixel location by adding or subtracting the nibble from an average of at least some of the pixel signal values of neighboring pixel locations contiguous to the selected pixel location.

3. The method of claim 2, wherein combining a particular nibble in a selected pixel location comprises combining the particular nibble in the selected pixel location by adding or subtracting the particular nibble from an average of all of the pixel signal values of neighboring pixel locations contiguous to the selected pixel location.

4. The method of claim 1, wherein selecting the pixel locations comprises selecting the pixel locations, at least in part, in accordance with a pseudo-random process.

5. The method of claim 4, wherein if a pixel location selected in accordance with the pseudo-random process is located in the center of a texture region, then, for that particular pixel location, selecting a pixel location in the center of the nearest non-texture region.

6. The method of claim 5, wherein the texture and non-texture regions comprise 3 by 3 regions of pixel locations.

* * * * *